United States Patent [19]

Tecinsky

[11] Patent Number: 4,798,999
[45] Date of Patent: Jan. 17, 1989

[54] NUMERICALLY CONTROLLED ELECTROMECHANICAL PRECISION DRIVE SYSTEM

[76] Inventor: Jaroslaw Tecinsky, Knesebeckstr.35-37, D-1000 Berlin 12, Fed. Rep. of Germany

[21] Appl. No.: 910,216
[22] PCT Filed: Dec. 20, 1985
[86] PCT No.: PCT/DE85/00552
  § 371 Date: Sep. 11, 1986
  § 102(e) Date: Sep. 11, 1986
[87] PCT Pub. No.: WO86/04467
  PCT Pub. Date: Jul. 31, 1986

[30] Foreign Application Priority Data

Jan. 15, 1985 [DE] Fed. Rep. of Germany ....... 3501477
Dec. 13, 1985 [DE] Fed. Rep. of Germany ....... 3544669

[51] Int. Cl.⁴ .............................................. H02P 7/68
[52] U.S. Cl. .......................................... 318/45; 318/41
[58] Field of Search ............................. 318/45, 49, 41

[56] References Cited

U.S. PATENT DOCUMENTS

| | | | |
|---|---|---|---|
| 2,215,646 | 9/1940 | Kugns | 318/45 |
| 2,515,565 | 7/1950 | Mohl | 318/8 |
| 2,860,266 | 11/1958 | Schrader | 310/112 |
| 3,268,785 | 8/1966 | Gesler et al. | 318/45 |
| 3,562,612 | 2/1971 | Munson | 318/45 X |
| 3,965,405 | 6/1976 | Romano | 318/317 |
| 4,152,992 | 5/1979 | Sugiyama | 318/45 X |
| 4,366,405 | 12/1982 | Schmider | 318/318 X |
| 4,525,655 | 6/1985 | Walker | 318/45 |
| 4,594,652 | 6/1986 | Mattson | 318/49 X |

FOREIGN PATENT DOCUMENTS

| | | |
|---|---|---|
| 0169794 | 4/1906 | Fed. Rep. of Germany . |
| 3234673 | 3/1984 | Fed. Rep. of Germany . |
| 3345528 | 6/1985 | Fed. Rep. of Germany . |
| 2057588 | 5/1971 | France . |
| 0439467 | 12/1967 | Switzerland . |

*Primary Examiner*—Bentsu Ro
*Attorney, Agent, or Firm*—Nies, Webner, Kurz & Bergert

[57] ABSTRACT

A numerically-controlled electromechanical precision drive system in which a plurality of low-current servomotor units are arranged in a circle around the driven shaft or push rod of an intermediate gear-wheel in such a way that pinion gears linked with its driven shaft engage with the intermediate gearwheel. The motor units are each driven in synchronism and are each independently linked with an emergency power supply and drive electronic system which receives the control pulses from a joint electronic control system, thus producing a multi-torque drive which provides the operating shaft with a rotational and/or translatory movement.

10 Claims, 13 Drawing Sheets

NUMERICALLY CONTROLLED ELECTROMECHANICAL PRECISION DRIVE SYSTEM

The invention pertains to a numerically controlled electromechanical precision drive system in which driven shafts of electromotors, provided with their own power supply, have pinions meshing with a middle gear arranged in a common housing (16), the middle gear having a spindle (20), for the parts to be driven, arranged parallel to the motor shafts, and wherein the control pulses are determined by parameters associated with the parts to be driven.

From the DE-OS No. 33 45 528 a method is known for controlling motor-driven high-pressure valves where the control of the motion of the valve regulating rod is controlled automatically and fully electronically in dependence on continuously performed and continuously indicated results of parameters such as pressure, temperature, position of the valve cone and such. With a device for carrying out this method, merely a single regulating motor is provided for the valve regulating rod. This results in the unit having to be shut down if the motor fails.

From the DE-OS No. 29 52 695 a method and a set-up is known for the control, monitoring and consumption measurement of a fluid flow valve where the signal for the control of the position of the valve body is used for measuring the fluid flow-through volume of the valve. Here also only a single step-motor is provided.

Hitherto designed electromechanical drive systems are, due to the mass inertia, relatively slow and not very dynamic. Their start-up is difficult and they cannot be driven with sufficient precision. It has been shown that with the known valve controls, the versatile demands made particularly by the measurement and control engineering fields on large and heavy electromechanical drives cannot be fulfilled.

SUMMARY AND OBJECTS OF THE INVENTION

In contrast to this, the invention is based on forming a numerically controlled electromechanical precision drive system of the initially mentioned type in such a way that with low power consumption, high-speed, sure and efficient drives are obtained which can also move heavy components with high precision in a large torque range and over the smallest of measured lengths, both in rotational operation and in translational operation as well as in combined rotational/translational operation. This task is fulfilled according to the invention with an electromechanical precision drive system of the type aforenoted, in which a large number of almost inertia-free light-current servomotors synchronously controlled independently of each other by means of a drive electronics with emergency power unit has small individual torques, and that the pinions on each servomotor are provided as planetary gears and the middle gear as a sun gear with relatively small toothing and wherein the sum of the individual torques combining in the spindle of the sun gear whereby a multi-torque drive occurs which effects a rotational and/or a translational motion of the spindle.

In this manner an electromechanical drive system is provided with an extremely good proportion of torque and pushing and pulling force to the drive volume, this having the following advantages:

1. small volume and thus low weight,
2. for this small volume, a high torque and push moment,
3. low energy consumption,
4. very precise positioning with corresponding feedback and high reproducibility,
5. immediate operability as opposed to hydraulic drives,
6. computer adaptability via a standardized interface.

The following fields of application are of particular interest: all types of valve controls, especially in those cases where precise settings of valves are required, here therefore in particular in chemical processing engineering, in aviation, space operations as well as in nuclear technology, precision drives in general mechanical engineering, e.g. for precision advance with all sorts of translational movements such as traversing, or in the field of CNC machines, with robots and manipulators, also in safety-relevant plants such as drives of reactor control means, and especially where maximum operational reliability is required and where in the event of a power failure the drives are to function perfectly.

Further novel features and other objects of this invention will become apparent from the following detailed description, discussion and the appended claims taken in conjunction with the accompanying drawings.

BRIEF DESCRIPTION OF THE DRAWINGS

Preferred structural embodiments of the subject matter of this invention are disclosed in the accompanying drawings, in which.

GENERAL DESCRIPTION

Figure 1:
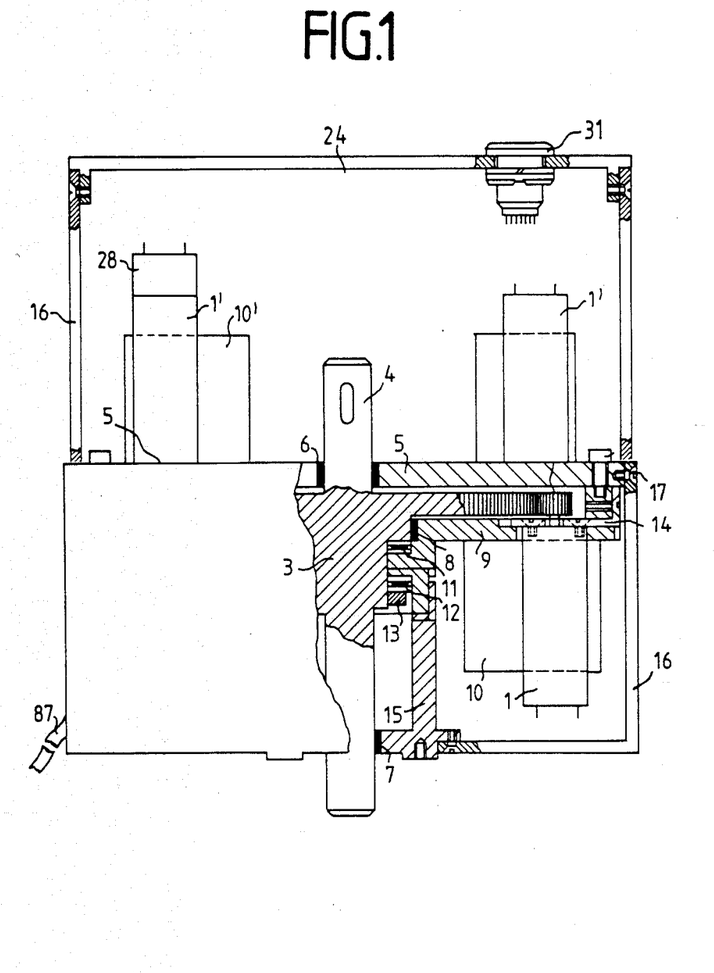
FIG. 1 shows a partially opened view in the longitudinal section for rotational drive.

FIG. 1 shows an arrangement for the rotational principle which is the simplest application.

The rotational principle is characterized by the fact that all motor and motor gear units 1 simultaneously act upon the middle gear 3 via their drive piniors2, said middle gear 3 being coupled in a fixed manner to the driven shaft 4. The motor units 1 are grouped about the middle gear 3 in a circular manner so that the pinions 2, in the form of planetary gears, mesh with a sun gear 3, with the pitch circles on both sides touching each other.

This fixed coupling is reached in FIG. 1 through the fact that the middle gear 3 and the driven shaft 4 are one piece.

The power transmission to other devices can take place in the common manner, e.g. through sliding clutch, slot and key, a feather key, or such.

The driven shaft 4 is guided in a cover 5 by means of a bearing 6 and a bearing 7, which is incorporated in a device connecting means 15. The bearing means 8 in the chassis 9 serves as additional bearing. On the chassis 9 emergency power supplies 10 for each motor 1 are additionally arranged, which supply the drive units 1 with power for a certain time period in case of a voltage drop.

Figure 9:
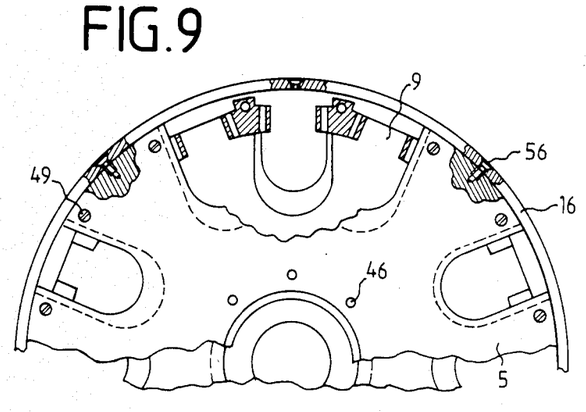
FIG. 9 shows a partially opened top view of the assembly of chassis, cover and housing.

The cover 5 and chassis 9 are connected together via screws 49 (FIG. 9). The fixing of the motor units 1 to the chassis 9 takes place via brackets which will be described later on.

The driven shaft 4 runs in two axial bearings 11 and 12, e.g. needle bearings, in the chassis 9. The fixing of the driven shaft 4 in the chassis 9 takes place via the lock nut 13.

A housing 16 encloses the entire arrangement, which is fixed to the cover 5 via screwing means 17.

The mechanical adapting to the processing machines takes place via the device connecting means 15 through suitable adapters which may be applied in the respectively required manner.

Figure 3:
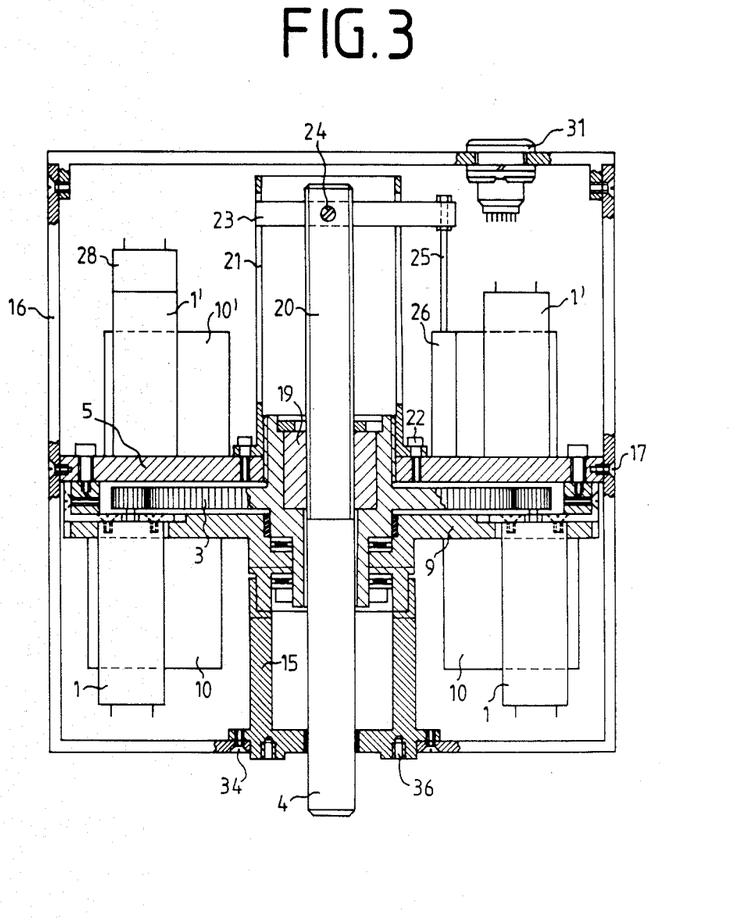
FIG. 3 shows a longitudinal section for translational operation.

The power supply is provided either through a cable 87 (FIG. 11) which is provided with cable ducts and strain relief or via the device connector and jack 31 (FIG. 3).

The motors 1 are preferably light-current servomotors with iron-free armature and permanent magnetic stator.

Figure 2:
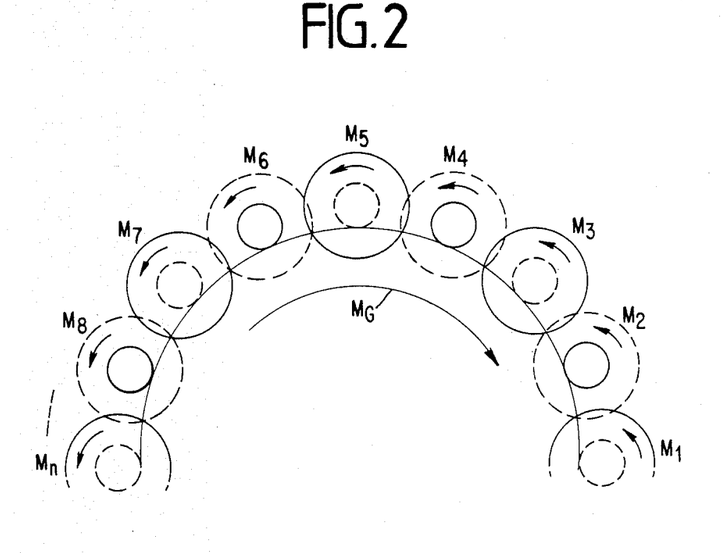
FIG. 2 shows a schematic top view of the drive system.

FIG. 2 shows in schematic form the circular arrangement of the motor units 1 and the interaction of the planetary gears 2 with the sun gear 3. Simultaneously it is indicated that part of the motor units with the individual torgues $M_1$, $M_3$, $M_5$, $M_7$, and $M_n$ is situated on the one side of the chassis 9, whereas a group of the same size with the individual torques $M_2$, $M_4$, $M_6$, $M_8$ is arranged on the other side or on the associated cover 5 in staggered arrangement for the purpose of space-saving.

The following embodiments of the invention all show this double arrangement of the motor units 1 on both side of the chassis 9.

This individual structure of the "multi-drive" means that the high number of the small torques can be transferred to a middle gear, this taking place via a very fine toothing of the pinion and the middle gear, corresponding to the small torque, as the sum of the individual torques only adds up in the center point of the large middle gear according to the formula $$M_G = M_1 + M_2 + M_3 + M_4 + \ldots M_n.$$

FIG. 3 shows how from the rotational principle the translational principle is reached.

In contrast to the rotational principle, a threaded member, a ball-screw or a satellite gear 19 is arranged in the hub of the middle gear 3 as regards the translational principle. The component part of the driven shaft 4 cooperating with the threaded member, is formed as a threaded spindle 20 which is hindered against rotation through the rotation blocking guide means 21. The rotation blocking guide means 21 has a fixed connection with the cover 5 via the screwing means 22. The spindle 20 runs in the rotation blocking guide means 21 via a precision guide means 23. It is connected firmly to the spindle via screwing means 24 or some other means of fastening.

Additionally, this precision guide means 23 acts upon the slider 25 of a linear motion pick-up 26. The read voltage on the linear motion pick-up 26 is proportional to the motion of the spindle 20.

On the chassis 9, as on the cover 5, there are affixed the motor units or motor gear units 1 and 1' respectively, as well as the emergency power supplies 10 and 10' for both.

The power supply for the motor units and emergency power supply takes place via a plug connection 31 which is arranged on the housing 16.

The housing 16 is attached both to the device connecting means 15 with the screwing means 34 and to the cover 5 via a screwing means 17.

The coupling to the processing machines takes place as with the rotational principle via screwing means 36 or via other suitable adapters.

The position of the spindle 20 can be read with a linear motion pick-up 26 as well as with an incremental motion pickup 28 which is positioned directly on the motor units or motor gear units 1, 1'.

The motion pick-ups can be formed in the known manner as inductive motion pick-ups, as linear motion pick-ups, as rotational motion pick-ups or as incremental motion pick-ups. If the motion pick-ups are formed as potentiometers, a voltage proportional to the motion can be tapped. With incremental motion pick-ups, pulses corresponding to the motion are counted and shown on an indicator. In this manner an accuracy of reading of $10^{-6}$ is obtained.

The rotational blocking of the spindle 20 can of course also take place in different suitable ways; for example, it is possible to form the housing 16 like a telescope and to shift the upper part together with the spindle, with the securing against rotation taking place by using feather keys, guide bolts or similar fixing means between the chassis 9, the cover 5 and the upper part of the housing 16.

Figure 4:
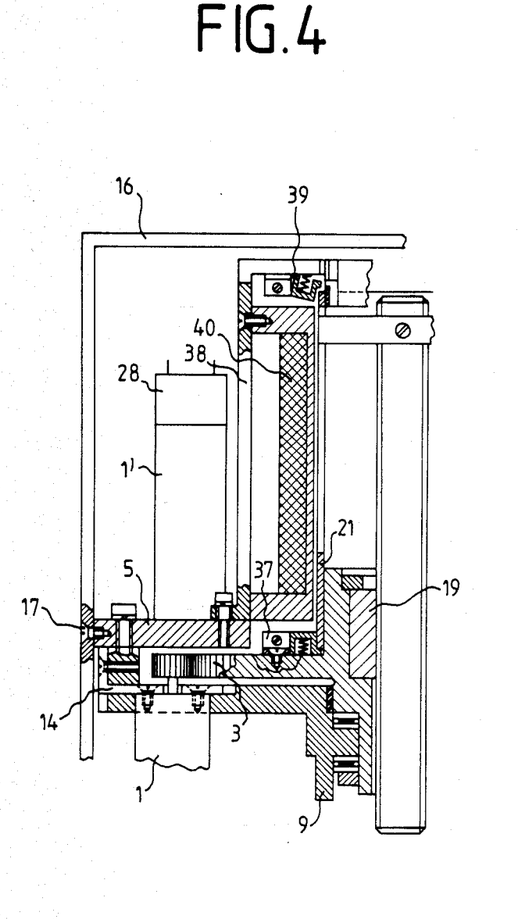
FIG. 4 shows a longitudinal section for alternating rotational and translational operation.

The rotational and the translational principles can be applied successively, as indicated in FIG. 4.

This rotational-translational principle is based on the fact that the spindle guide cylinder 21 with the rotational blocking is on the one hand fixed to the middle gear 3 through a clamping means 37 and on the other hand, with the translational operation, is fixed with the non-turning part 38 of the drive through a clamping means 39, so that to begin with rotation takes place and then translation. The rotational torque corresponds to the previously described rotational principle, same as the pushing or pulling force corresponds to the previously described translational principle.

Advantageous is an inductive switchover from rotational operation to translational operation, and vice versa.

Through the reversal of polarity of the d.c. supply of an inductor 40, the spindle guide cylinder 21, acting as armature, is pressed upward or downward into the clamping device 37 or 39 respectively. Thus the spindle guide cylinder 21 is either connected to the rotating part, i.e. the middle gear 3, or with the stationary part 38. In this manner the successive rotational-translational motion occurs.

Figure 5:
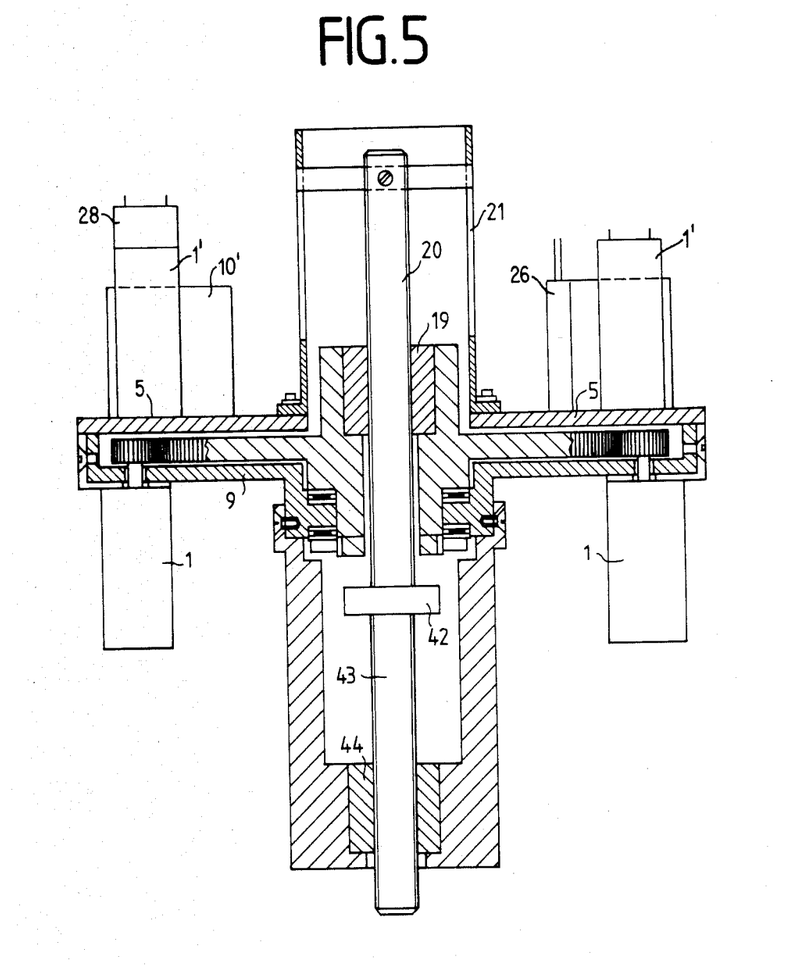
FIG. 5 shows a longitudinal section for simultaneous rotational and translational operation

It is, however, also possible to apply the rotational principle and the translational principle simultaneously, as FIG. 5 shows.

With simultaneous rotational-translational motion, the spindle 20 which runs in the ball-screw 19 via a clutch 42, acts upon a further spindle 43 which runs in a further ball-screw 44. Rotation of the spindle 20 is prevented through the rotation blocking guide means 21 so that the spindle 20 performs a translational motion. As the spindle 43 is not coupled with the spindle 20, yet is situated in a ball-screw 44 which has a certain pitch, the additional spindle 43 describes a simultaneous rotational-translational motion.

The translational speed corresponds to the rotational speed of the motor gear units 1 and the pitch of the ball-screw 19.

The translational-rotational motion of the spindle 43 is made up of the motion of the previously described motion of the spindle 20 and the pitch of the ball-screw 44.

The two spindles 20 and 43 are not fixed to each other, but have a sliding coupling. Needle bearings can be interposed or the connection can be provided via a sliding clutch 42, the transmission torque of which can be variably set. Other types of clutches available on the market are also applicable according to requirement.

The fastening of this drive to the processing machines can likewise take place according to the previously described principles.

Figure 6:
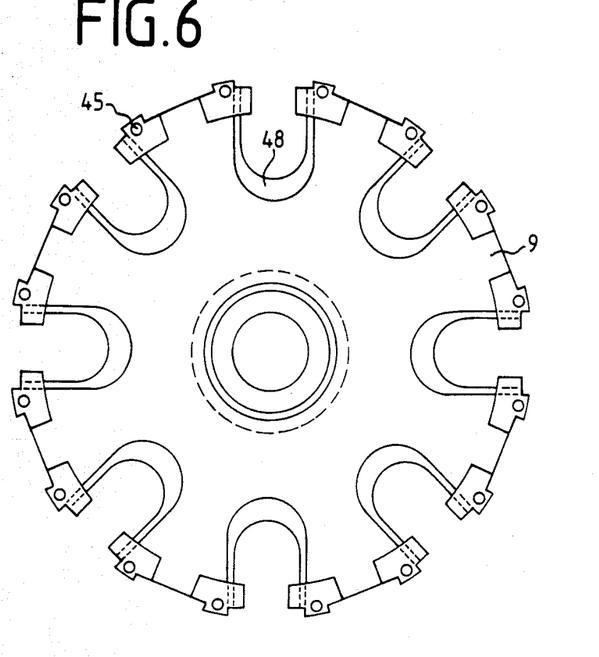
FIG. 6 shows a view from above onto the chassis.

FIG. 6 shows the chassis 9 from a top view. The chassis is the supporting element for the total assembly. In this chassis 9, both the motor units or motor gear units 1 and the entire power transmission elements (pinion 2, gear 3, ball-screw 19, and driven shaft 4) are integrated.

The chassis is the only supporting element which can be coupled with all the processing machines from the most various of application fields via the device connecting means 15.

Figure 7:
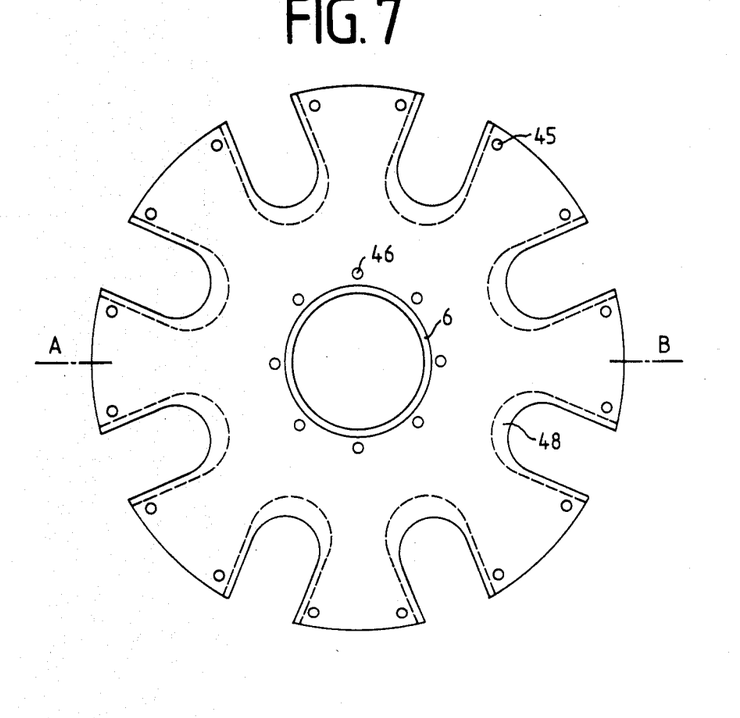
FIG. 7 shows a top view onto the cover belonging to FIG. 6.

FIG. 7 shows the cover 5 of the chassis 9. The cover 5 is provided with through-holes 45 for subsequent fixing to the chassis 9 using screws 49.

Additionally there are bore holes 46 with threads provided for the rotation blocking guide means 21 and the bearing 6. Furthermore the cover is provided with guideways 48 for the motor or motor gear fastening brackets 14.

Figure 8:
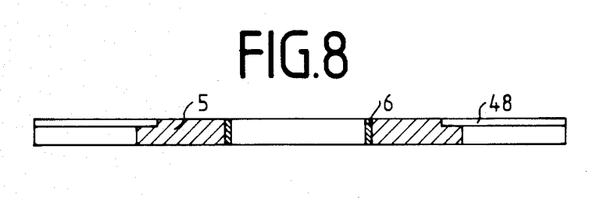
FIG. 8 shows a section along line A—B in FIG. 7.

FIG. 8 is a section along A—B through the front view of the cover 5 with the bearing 6. At the same time the guideways 48 for the motor or motor gear units 1 can be seen.

FIG. 9 shows a top view on the assembly of the chassis 9, the cover 5 and the housing 16 without the motor gear units.

The cover 5 is screwed tight onto the chassis 9 through screws 56, the housing 16 is correspondingly fixed to the cover 5 screws 49.

Figure 10:
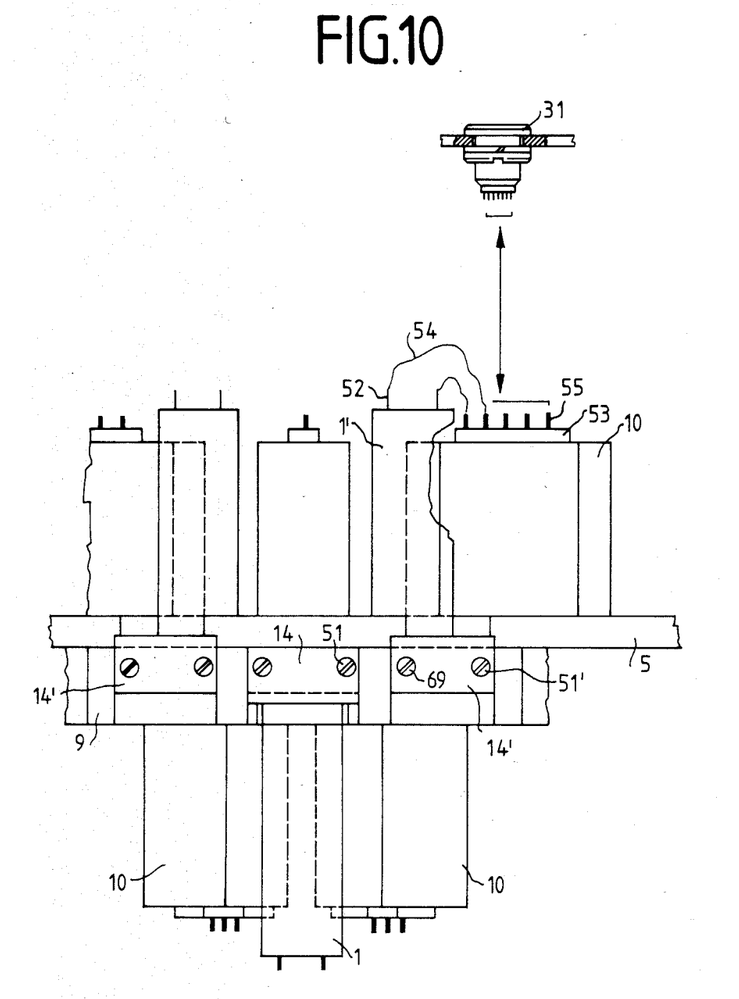
FIG. 10 shows a view of the assembly in FIG. 9 with motor units, emergency power supply and cabling.

FIG. 10 shows a front view of a part of the chassis 9 with motor units or motor gear units 1 mounted on the fastening brackets 14, and part of the cover 5 with motor units or motor gear units 1' mounted on the fastening brackets 14.

Additionally, the emergency power supplies 10 and 10' are situated on the chassis 9 and the cover 5 respectively.

The motor or motor gear units 1 form an insertion with the fastening brackets 14 into the chassis plane and are screwed to the chassis 9 with screwing means 51.

They form an insertion with the fastening brackets 14 which is conducted into the chassis cover 5 but which is fastened via the screwing means 51' to the chassis 9.

The motor or motor gear units 1, 1' are connected to a drive electronics with integrated emergency power supply 10, 10'. This takes place in that the motor poles 52 are connected to the contacts 55 situated on the control electronics with integrated emergency power supply, at the tag block 53. This is provided through the wiring 54.

Figure 11:
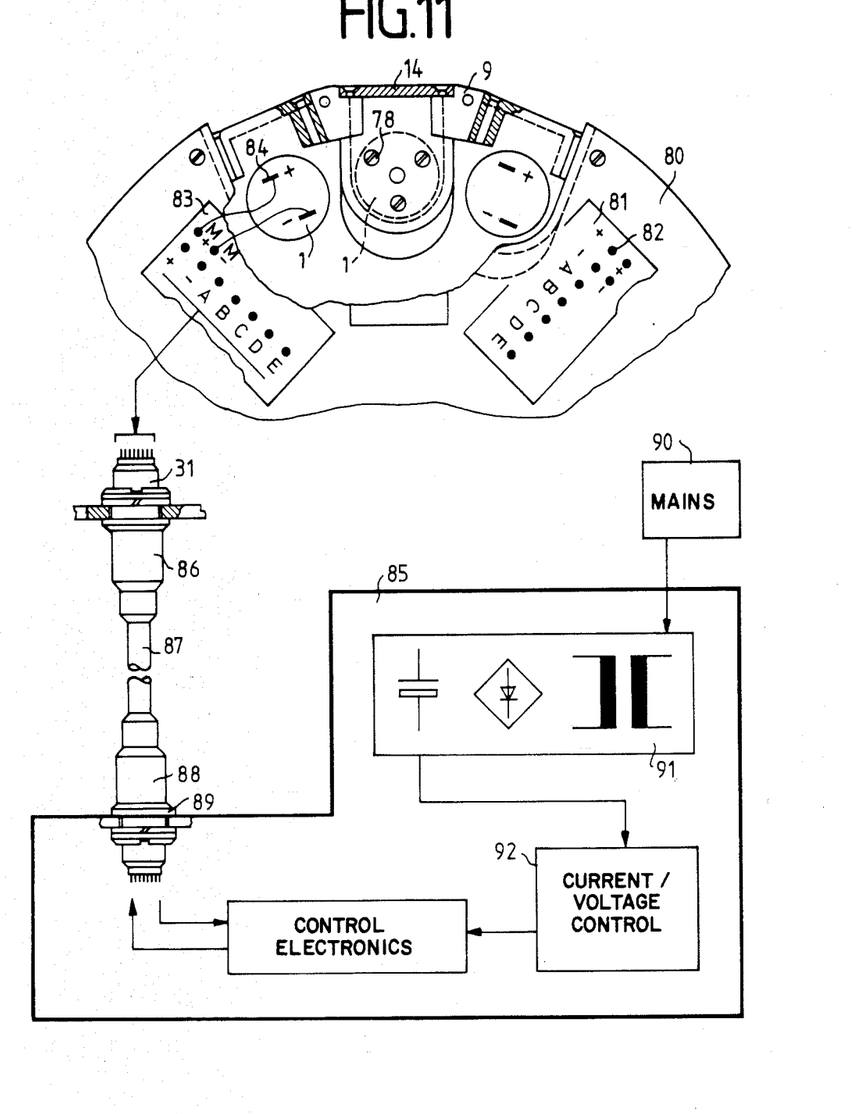
FIG. 11 shows a part assembly of the chassis, cover, motor units, drive electronics and control electronics.

FIG. 11 shows the arrangement of all the components in a top view, wherein simultaneously the control electronics 85 and its connection to the connector jack 31 are indicated. On the chassis 9 there are the motor or motor gear units 1 mounted on fastening brackets 14, said motor units being attached to the brackets via the screwing means 78. Here also the motor gear units 1 are mounted in a staggered manner with a certain angle which depends on the number of the motor or motor gear units used.

On the cover 5 there is situated the drive electronics 81 with the integrated emergency power supply 10' which is provided 35 with a solder pin block 82. The solder pins+/− and A-E are electrically connected with the connector jack 31. The contacts M+/M− are electrically connected to the motor poles 84 through the cabling 83.

The connection with the control electronics 85 takes place via a device connector 86 and cable 87 which on the other side is connected with a device connector 88. The device connector 88 is coupled with the built-in device socket 89. Thus the data transmission from the control electronics 85 to the drive electronics 81 is provided. The control electronics is supplied with a regulated voltage supply via a non-regulated power unit 91 and via the power supply current/voltage regulator 92 by the power supply 90.

Figure 12:
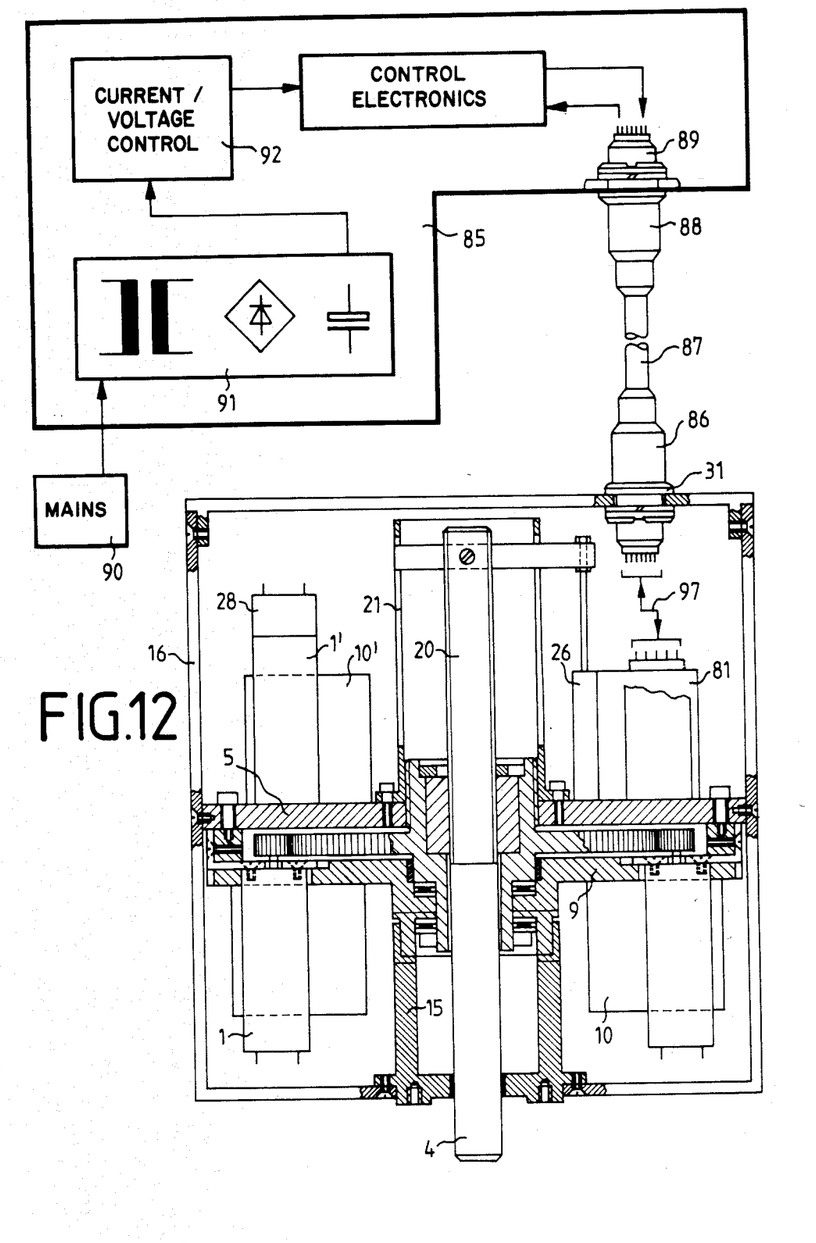
FIG. 12 shows a longitudinal section through the assembly of FIG. 3 with control electronics and cabling.

FIG. 12 shows the connection of the numerically controlled electromechanical precision drive system to the control electronics 85. The control electronics 85 is connected to the connector jack 31 via a built-in device socket 89, the cable connector 88 and the cable connector 86.

The connector jack 31 is electrically connected to the drive electronics 81 via a cable 97.

Figure 13:
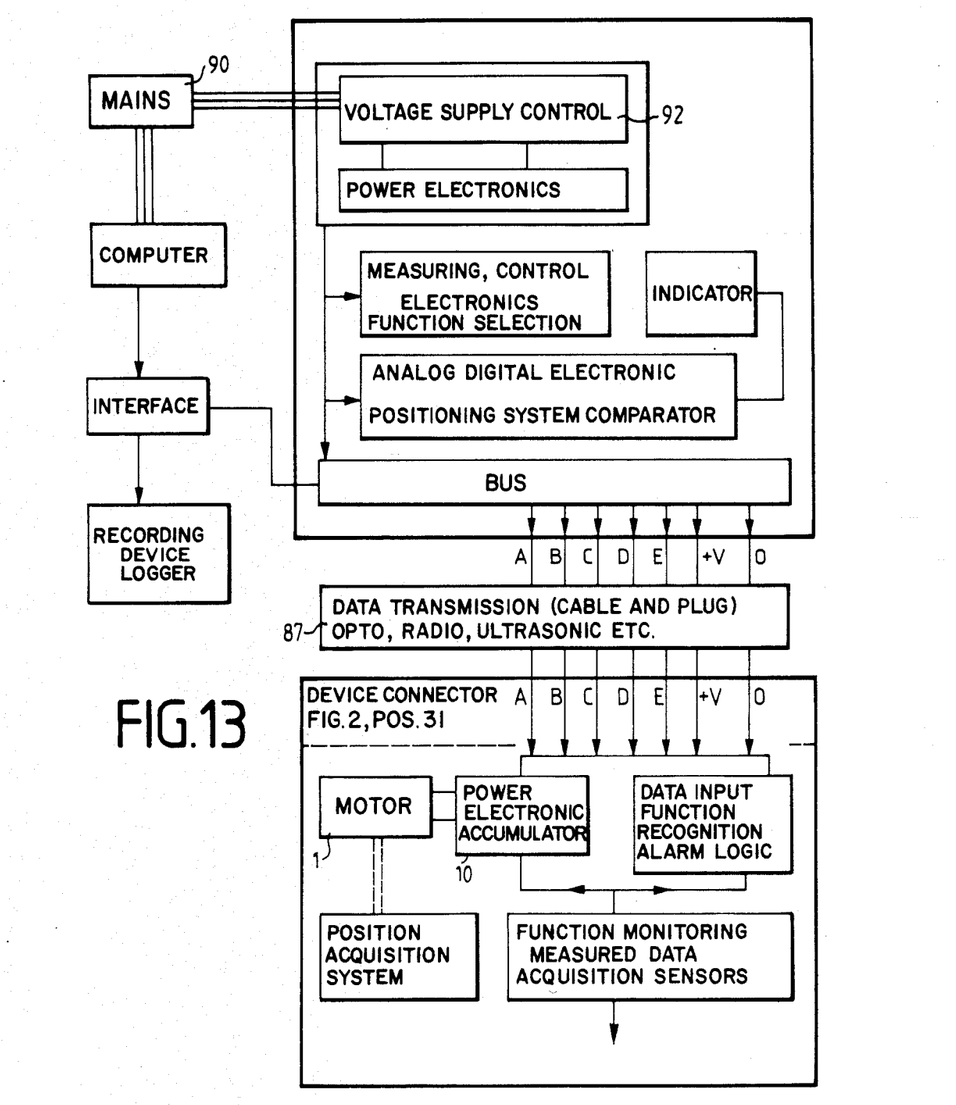
FIG. 13 shows a block diagram.

In the block diagram of FIG. 13, the interrelationship between the electronic assemblies is shown. Details can be taken from the DE-OS No. 33 45 528.

Here there are also details on the structure and mode of effect of the control electronics 85. This control, like that according to the DE-OS No. 33 45 528, is computer- and "CAMAC"-compatible.

The principle of the invention is based, among other things, on the fact that a single servomotor, whether a normal electromotor or a step-by-step switching motor, is replaced by a large number of smaller light-current motors.

Figure 14:
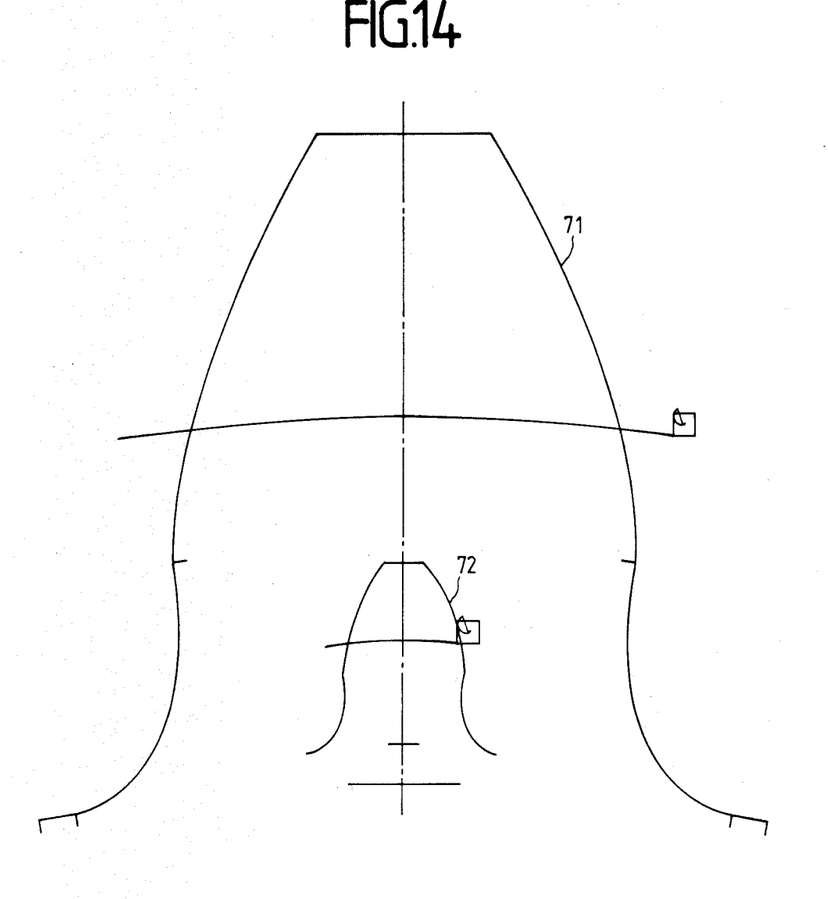
FIG. 14 shows a size comparison of the modules.

FIG. 14 shows the difference between the module m of the tooth connection with the use of only one motor—as hitherto known—or of a large number of motor or motor gear units.

In the illustrated example, a torque of 200 Nm with corresponding pushing force is required.

Using a single drive, the
diameter of the middle gear 3 is 389.888 mm
diameter of the pinions 2 is 54.000 mm
with a center-to-center distance of 443.000 mm.

This corresponds to a module 71 m=3.

With 16 drives 1, 1' on the other hand, the middle gear diameter is only 103.970 mm that of the pinions only 14.400 mm.

This corresponds to a module 72 m=0.8.

Therefore, in addition to the other advantages already mentioned, there is a considerable reduction in space requirement with equal performance, quite apart from less slippage, accordingly less dead times and correspondingly greater dynamics of the system.

Figure 15:
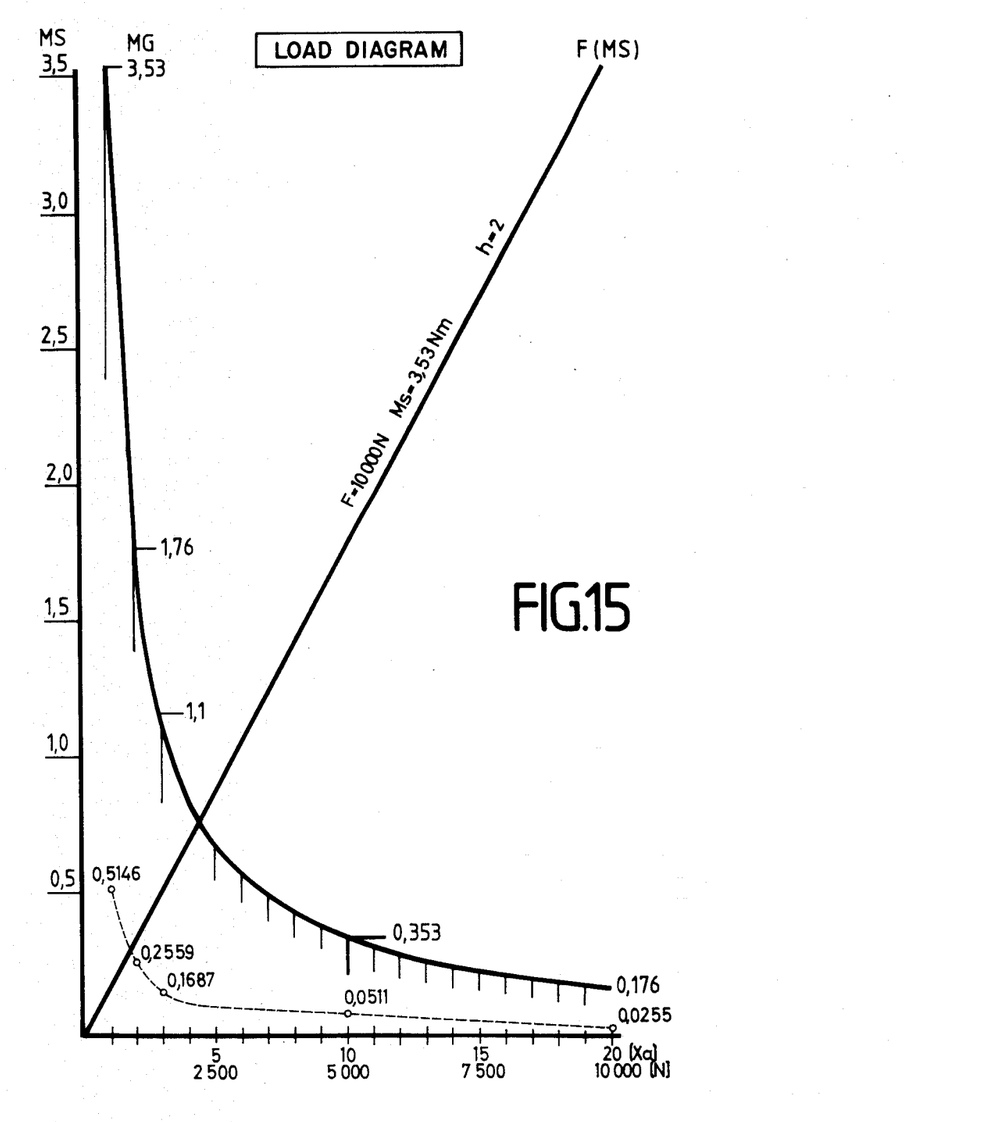
FIG. 15 shows a load diagram.

In FIG. 15 a load diagram is shown. The load diagram MS/MG is a graphic portrayal of the proportionally increasing torque MS on the sun gear 2 towards the increasing load F (Nm) on the driven shaft 4 or the spindle 20.

If MS is the required total torque (sun gear), MG the required torque on the driven shaft (pinion) of the individual drive (motor unit), Xa the number of the individual drives (e.g. 16), then $$MG = 1/Xa \cdot MS.$$

The curve MG in the load diagram shows the progression of the required torque with the use of several individual drives. It can be seen from this formula that the curve MG progresses hyperbolically, i.e. also the load of the individual drive reduces hyperbolically. Furthermore, the MG curve shows that at the value Xa=10 it takes up a linear progression. This is also the range where individual drives no longer have to be loaded to a maximum (safety range).

The interesting phenomenon of this drive is that the dynamic behavior of the total drive corresponds to the dynamic behavior of the individual drive, i.e. the rotor moment of inertia ($kgm^2$) of the total drive corresponds to the rotor moment of inertia of the individual drive, with the moment of inertia of the sun gear 3 of course having to be taken into consideration.

The curve F (MS) proves that the total torque behaves proportionally in relationship to the load. The required torque on the individual drive drops with the ratio of transmission i, also the speed (rpm) drops correspondingly proportionally at the driven shaft of the drive system.

With 16 individual drives, i.e. Xa=16, in the given example, the drives are loaded with only about 32%. This results in the fact that with a failure of over 60%, the functionability of this drive system remains fully guaranteed. With a failure of 60% of a conventional drive, the functioning is no longer guaranteed.

Thus, as the forces are distributed over the total periphery of the middle gear or sun gear 3, the mechanical load on the toothing also drops.

With a practical embodiment, with a load F=10,000 N corresponding to the graph F (MS) with 16 light-current servomotors 1, 1' surrounding the sun gear 3, each of these require a power of 12 V.1,1A=13.2W, i.e. all 16 together a power of 211.20W.

If the middle gear has a diameter of 80 mm, the pinions 2 a diameter of 12 mm, the shaft 4 or spindle 20 a diameter of 28 mm and a length of 70 mm, then with this extremely low power, with a sliding travel of 20 mm, a pushing force of about 10,000 Nm can be achieved, with the precision of the control being adjustable between speeds of 0.1 up to 30,000 revolutions per minute.

The object in developing this novel numerically controlled precision drive system was to reduce the neutral zones and further parameters—which with a conventional electro-drive are very high—to as low a value as possible.

This effect is obtained through the desired torque (MS in Nm) of the conventional electromotors being replaced by individual drives with the torque $M_n$ and letting them simultaneously act on the middle gear (sun gear) via pinions (planets).

Thus the dynamic behavior and the starting torque increase, with the energy consumption in idle run dropping to a minimum. The proportion of volume to performance and the efficiency increase considerably.

When using servomotors with iron-free armatures (so-called bell type armatures or drum armatures) as individual drives, the proportion of volume to weight and performance is also considerably more favorable than with electromechanical drives of conventional design. The armature made of dynamo sheet is heavy and thus very slow in startup. The rotor moment of inertia ($kgm^2$) and the mechanical time constant (ms) are relatively high.

Here the reaching of these speeds is considerably impaired through the rotor-mass-moment of inertia. With conventional motors in this performance range, for instance, it is only possible to reach speeds in the 100 ms range. With the proposed drive, however, it is possible to reach these speeds in 80% less time.

The same applies to the driving dynamics, i.e. to the fast startup, switchover and such. Here also a considerably faster reverse drive is reached, e.g. when using a single drive the reverse operation would require 130 ns. When using this new drive the reverse operation would only amount to 20 to 30 ns. These values relate to standard diodes in the control and drive electronics. Through the use of special electronic components, even better control values can be reached.

In summary, the following can be stated:
The small mechanical time constant (ms)
the slight rotor moment of inertia ($kgm^2$)
the slight slippage and thus also
the extremely low dead time (ms)
of the described drive system are the decisive factors which distinguish, in an essentially positive manner, the dynamic behavior as opposed to the conventional electromechanical drives.

Therefore, through this new precision drive system, very fast control processes can be carried out.

Through the additive control of the individual drives, numerous power stages are reached corresponding to the number Xa of the drives. Due to its specific mechanical structure it is infinitely variable. Through the time constants, positioning, speed control, pulling or pushing speed (or pulling or pushing force) occur in a problem-free and absolutely precise manner.

The low power intake of the light-current motors allows battery operation (emergency power units), which of course is of great significance for safety areas and areas where persons are in direct contact with dangerous media. Thus it is always possible in case of computer control electronics failure, cable rupture, explosion, etc., for high pressure valves in the safety area, for instance, to still reach a defined and previously programmed status.

The same applies to others of the named fields of application.

Finally, it is pointed out that this new multi-drive bases its advantages on the fact that the torque and thus also the pushing or pulling force at the spindle on the middle gear is determined by the number of the individual drives and thus also of the small torques, with the dynamics of the multi-system not being impaired.

In this manner an "n phase multi-drive" is provided which is very powerful, fast, light and small in dimensions, so that also the proportion of volume-weight to performance becomes very favorable.

I claim:

1. An electromechanical precision drive means with a drive mechanism including drive shaft (4, 20) and a plurality of permanently magnetically excited, virtually inertia-free direct current motors (1, 1') with ironless armatures, wherein: each d.c. motor has a shaft with a pinion (2, 2') relatively small in diameter secured thereto; the shafts of said d.c. motors (1, 1') are parallel to said drive mechanism drive shaft (4, 20) of said drive means; said drive mechanism includes a middle gear (3) relatively large in diameter; said d.c. motors (1, 1') with their identically designed pinions (2, 2') are equally distributed around the periphery of said middle gear (3) and said pinions engage said middle gear (3); said d.c. motors comprise a circular arrangement of a first group of motors (1) kept to one side of said middle gear (3) and a circulat arrangement of an equal sized second group of motors (1') kept to the other, opposite side of said middle gear (3); the two groups of motors (1, 1') are in staggered relation to each other such that one pinion (2) each of the first group lies between two pinions (2') of the second group of motors and vice versa; an independent voltage supply is provided for each d.c. motor enabling each d.c. motor (1, 1') to constitute a separately controlled and monitored autonomous motor unit; and means synchronously control all d.c. motors independently of each other.

2. A precision drive means according to claim 1, wherein each separately and independently controlled and monitored autonomous motor unit has its own emergency power supply (d.c. battery), with the charge thereof being checked continuously.

3. A precision drive means according to claim 1, wherein the first group of motors is mounted in the chassis (9) of the housing of said drive means and the second group of motors is mounted in the housing cover, with each motor unit being individually replaceable.

4. A precision drive means according to claim 3, wherein the chassis (9) and the cover (5) of the housing have radial recesses for insertion of uniformly sized brackets (14, 14') as carriers of each autonomous motor unit.

5. A precision drive means according to claim 1, wherein at least one motor (1, 1') is connected to an incremental motion pick-up (28).

6. A precision drive means according to claim 1, wherein the middle gear (3) has a hub provided as a threaded nut (19) as part of a worm drive with one main threaded spindle shaft (20) connected to said drive shaft (4).

7. A precision drive means according to claim 6, wherein an additional device (21, 23) for blocking the rotation of the main threaded spindle shaft (20) is provided.

8. A precision drive means according to claim 7, wherein the additional device (21, 23) is axially displaceable and is frictionally connected in a first position to the middle gear (3) and is frictionally connected in a second position to a portion of the housing of said drive means.

9. A precision drive means according to claim 8, wherein the axial displacement of said additional device between said first and second positions is carried out inductively by means of an electric coil (40).

10. A precision drive means accordinf to claim 7, wherein the additional device (21, 23) is secured ot the housing on one side of the middlegear (3) and a further additional device is secured to the housing on the other side of the middle gear, said further additional device having a nut (44) for an additional worm gear, with the threaded spindle (43) thereof being connected to the main threaded spindle shaft (20) via a clutch (42).

* * * * *

UNITED STATES PATENT AND TRADEMARK OFFICE
CERTIFICATE OF CORRECTION

PATENT NO.   :   4,798,999

DATED        :   January 17, 1989

INVENTOR(S)  :   JAROSLAV TECINSKY

It is certified that error appears in the above-identified patent and that said Letters Patent is hereby corrected as shown below:

ON THE COVER PAGE:

First Column
    Item [76] - Correct the Inventor's First Name to read

--JAROSLAV--.

Item [56], References Cited, U.S. Patent Documents -
The name of the Patentee in U. S. Patent No. 2,215,646 is

--KUHNS--.

Column 9, line 23, "circulat" should be --circular--.

Signed and Sealed this

Nineteenth Day of September, 1989

Attest:

DONALD J. QUIGG

Attesting Officer

Commissioner of Patents and Trademarks